United States Patent [19]
Voigt et al.

[11] Patent Number: 5,960,451
[45] Date of Patent: Sep. 28, 1999

[54] SYSTEM AND METHOD FOR REPORTING AVAILABLE CAPACITY IN A DATA STORAGE SYSTEM WITH VARIABLE CONSUMPTION CHARACTERISTICS

[75] Inventors: Douglas L. Voigt; Richelle L. Ahlvers; Wade A. Dolphin, all of Boise, Id.

[73] Assignee: Hewlett-Packard Company, Palo Alto, Calif.

[21] Appl. No.: 08/932,812

[22] Filed: Sep. 16, 1997

[51] Int. Cl.$^6$ .................................................. G06F 1/00
[52] U.S. Cl. ........................................ 711/114; 360/902
[58] Field of Search ................................ 711/114; 713/1, 713/100; 360/902

[56] References Cited

U.S. PATENT DOCUMENTS

| | | | |
|---|---|---|---|
| 5,392,244 | 2/1995 | Jacobson et al. | 711/114 |
| 5,519,844 | 5/1996 | Stallmo | 711/114 |
| 5,651,133 | 7/1997 | Burkes et al. | 711/114 |
| 5,659,704 | 8/1997 | Burkes et al. | 711/114 |

OTHER PUBLICATIONS

Zabback et al., The RAID Configuration Tool (0–8186–7557–Aug. 96); 3rd International Conference on High Performance Computing, Proceedings; IEEE 1996; pp. 55–61.

Sahai; Performance Aspects of RAID Architectures (0–7803–3873–Jan. 1997); IEEE 1997; pp. 321–327.

Wilkes et al., The HP AutoRAID Hierarchical Storage System (0734–2071/96); ACM Transactions on Computer Systems, vol. 14, No. 1; ACM 1996; pp. 1–27.

*Primary Examiner*—David L. Robertson

[57] ABSTRACT

A data storage system has an administrator tool that presents an existing LUN arrangement composed of one or more types of LUNs and an available capacity for the existing LUN arrangement. The administrator tool provides a graphical user interface (UI) that allows the administrator to propose different configurations with one or more additional hypothetical LUNs, without in fact creating them. The UI provides a set of controls representative of the different LUN types. The administrator can graphically manipulate the controls to vary characteristics of the hypothetical LUNs. As the administrator manipulates the controls, the system dynamically computes available capacity assuming a LUN arrangement that includes both the existing LUNs and the hypothetical LUNs. The graphical UI reports the changing available capacity as a response to the administrator's manipulation so that the administrator can gain an appreciation of how the hypothetical LUNs might affect available capacity. Assuming there is sufficient available capacity, the administrator can direct the system to create new LUNs having the same characteristics of the hypothetical LUNs.

20 Claims, 6 Drawing Sheets

SYSTEM AND METHOD FOR REPORTING AVAILABLE CAPACITY IN A DATA STORAGE SYSTEM WITH VARIABLE CONSUMPTION CHARACTERISTICS

FIELD OF THE INVENTION

This invention relates to data storage systems, such as hierarchical RAID (Redundant Array of Individual Disks) data storage systems. More particularly, this invention relates to systems and methods for reporting available capacity in such data storage systems given variable consumption rates.

BACKGROUND OF THE INVENTION

Conventional disk array data storage systems have multiple storage disk drive devices that are arranged and coordinated to form a single mass storage system. The common design goals for mass storage systems include low cost per megabyte, high input/output performance, and high data availability. Data availability involves the ability to access data stored in the storage system while ensuring continued operation in the event of a disk or component failure. Data availability is often provided through the use of redundancy where data, or relationships among data, are stored in multiple locations on the storage system. In the event of failure, redundant data is retrieved from the operable portion of the system and used to regenerate the original data that is lost due to the component failure.

There are two common methods for storing redundant data: mirror and parity. In mirror redundancy, data is duplicated and stored in two separate areas of the storage system. In parity redundancy, redundant data is stored in one area of the storage system, but the size of the redundant storage area is less than the remaining storage space used to store the original data.

RAID (Redundant Array of Independent Disks) storage systems are disk array systems in which part of the physical storage capacity is used to store redundant data. RAID systems are typically characterized as one of six architectures, enumerated under the acronym RAID. A RAID 0 architecture is a disk array system that is configured without any redundancy. Since this architecture is really not a redundant architecture, RAID 0 is often omitted from a discussion of RAID systems.

A RAID 1 architecture involves storage disks configured according to mirror redundancy. Original data is stored on one set of disks and a duplicate copy of the data is kept on separate disks. The RAID 2 through RAID 5 architectures all involve parity-type redundant storage. Of particular interest, a RAID 5 system distributes data and parity information across all of the disks. Typically, the disks are divided into equally sized address areas referred to as "blocks". A set of blocks from each disk that have the same unit address ranges are referred to as "stripes". In RAID 5, each strip has N blocks of data and one parity block which contains redundant information for the data in the N blocks.

In RAID 5, the parity block is cycled across different disks from stripe-to-stripe. For example, in a RAID 5 system having five disks, the parity block for the first stripe might be on the fifth disk; the parity block for the second stripe might be on the fourth disk; the parity block for the third stripe might be on the third disk; and so on. The parity block for succeeding stripes typically "precesses" around the disk drives in a helical pattern (although other patterns are possible). RAID 2 through RAID 4 architectures differ from RAID 5 in how they compute and place the parity block on the disks.

A background discussion of RAID systems, and various ways to logically partition RAID systems, is found in U.S. Pat. No. 5,519,844 to David C. Stailmo, entitled "Logical Partitioning of a Redundant Array Storage System".

A hierarchical data storage system permits data to be stored according to different techniques. In a hierarchical RAID system, data can be stored according to multiple RAID architectures, such as RAID 1 and RAID 5, to afford tradeoffs between the advantages and disadvantages of the redundancy techniques.

U.S. Pat. No. 5,392,244 to Jacobson et al., entitled "Memory Systems with Data Storage Redundancy Management", describes a hierarchical RAID system that enables data to be migrated from one RAID type to another RAID type as data storage conditions and space demands change. This patent, which is assigned to Hewlett-Packard Company, describes a multi-level RAID architecture in which physical storage space is mapped into a RAID-level virtual storage space having mirror and parity RAID areas (e.g., RAID 1 and RAID 5). The RAID-level virtual storage space is then mapped into an application-level virtual storage space, which presents the storage space to the user as one large contiguously addressable space. During operation, as user storage demands change at the application-level virtual space, data can be migrated between the mirror and parity RAID areas at the RAID-level virtual space to accommodate the changes. For instance, data once stored according to mirror redundancy may be shifted and stored using parity redundancy, or vice versa. The '244 patent is hereby incorporated by reference to provide additional background information.

With data migration, the administrator is afforded tremendous flexibility in defining operating conditions and establishing logical storage units (or LUNs). As one example, the RAID system can initially store user data according to the optimum performing RAID 1 configuration. As the user data approaches and exceeds 50% of array capacity, the disk array system can then begin storing data according to both RAID 1 and RAID 5, and dynamically migrating data between RAID 1 and RAID 5 in a continuous manner as storage demands change. At any one time during operation, the data might be stored as RAID 1 or RAID 5 on all of the disks. The mix of RAID 1 and RAID 5 storage changes dynamically with the data I/O (input/output). This allows the system to optimize performance versus an increasing amount of user data.

To ensure that sufficient space is retained for data migration, the RAID system limits the number of blocks that can be allocated to mirror RAID areas. One particular approach is described in U.S. Pat. No. 5,659,704 to Burkes et al., entitled "Methods and Systems for Reserving Storage Space for Data Migration in a Redundant Hierarchic Data Storage System by Dynamically Computing Maximum Storage Space for Mirror Redundancy". This patent, which is assigned to Hewlett-Packard Company, describes a hierarchic RAID system that computes a maximum number of virtual blocks in mirror RAID areas based on a function of the physical capacity of the storage disks, the number of storage disks, and the allocated capacity at the time of each storage request from the user. This patent is incorporated by reference.

To avoid over-committing the RAID-level virtual storage space, the RAID system computes a total virtual capacity that is available to the administrator to handle future storage requests. The available capacity computation is based on such factors as size and number of disks, characteristics of the RAID 1 and RAID 5 storage, a minimum percentage to be used for RAID 1 storage, whether an active hot spare option is requested, and so forth. U.S. patent Ser. No. 08/382,350 to Burkes et al., entitled "Methods for Avoiding Over-Commitment of Virtual Capacity in a Redundant Hierarchic Storage System", filed Feb. 1, 1995, describes one technique for computing available capacity in more detail. This patent application, which is assigned to Hewlett-Packard Company, is incorporated by reference.

It is clear from the nature of RAID technology that pure RAID 1 consumes physical space at a faster rate than an architecture that employs a dynamic mixture of RAID 1 and RAID 5 (as is taught in the '244 patent). Additionally, the combined RAID 1 and RAID 5 architecture consumes physical space at a faster rate than pure RAID 5. In a system with fixed physical capacity, it would be beneficial to determine how much usable capacity can be afforded simultaneously for each logical unit type, given the diversity of consumption rates among the various types.

SUMMARY OF THE INVENTION

This invention provides a system and method for reporting information on available capacity and current RAID configuration to the administrator in a clear and usable manner so that the administrator can make informed decisions concerning creation or reconfiguration of current logical storage unit (LUN) characteristics. In one aspect of the invention, the system provides a graphical user interface (UI) that presents an existing LUN arrangement composed of multiple types of LUNs. The graphical UI further shows the available capacity given the existing LUN arrangement.

The graphical UI also allows the administrator to propose different configurations with one or more additional hypothetical LUNs, without physically creating them. The UI provides a set of controls that are representative of the different LUN types. The administrator can graphically manipulate the controls to vary characteristics of the hypothetical LUNs. As the administrator manipulates the controls, the system dynamically computes available capacity assuming a LUN arrangement that includes both the existing LUNs and the hypothetical LUNs. The graphical UI reports the changing available capacity as a response to the administrator's manipulation so that the administrator can gain an appreciation of how the hypothetical LUNs, if added to the existing system, might affect available capacity.

Assuming there is sufficient available capacity, the system permits the administrator to create new LUNs having the same characteristics of the hypothetical LUNs.

BRIEF DESCRIPTION OF THE DRAWINGS

The same reference numbers are used throughout the figures to reference like components and features.

DETAILED DESCRIPTION OF THE INVENTION

Figure 1:
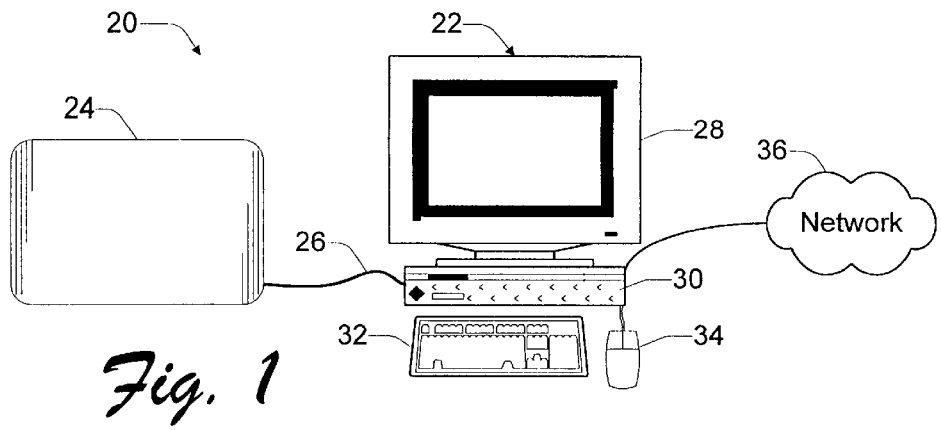
FIG. 1 is a diagrammatic illustration of a host computer connected to a data storage system.

FIG. 1 shows a computer system 20 having a host computer 22 connected to a data storage system 24 via an I/O interface bus 26. Host computer 22 is a general purpose computer that can be configured, for example, as a server or workstation. Computer 22 has a visual display monitor 28, a central processing unit (CPU) 30, a keyboard 32, and a mouse 34. Other data entry and output peripherals may also be included, such as a printer, tape, CD-ROM, network interfaces, and so forth. In FIG. 1, the host computer 22 is coupled to a network 36 to serve data from the data storage system 24 to one or more clients (not shown).

The data storage system 24 holds user data and other information. In the preferred implementation, the data storage system 24 is a hierarchical RAID system that is capable of storing data according to different redundancy schemes. The host computer 22 provides an interface for an administrator to configure the memory space in the RAID system 24, run diagnostics, evaluate performance, and otherwise manage the RAID storage system.

According to one particular aspect of this invention, the host computer 22 enables the administrator to propose different memory configurations for the data storage system 24 during ongoing operation. Given a present storage mix, the administrator can specify characteristics of one or more hypothetical logical storage units (or LUNs) without actually creating them. Based on the administrator's proposed LUN arrangement, the data storage system 24 computes the available capacity for the user data, taking into account the hypothetical, but uncreated, LUNs. The available capacity is reported to the administrator. If the system will handle the additional LUNs, the administrator can instruct the data storage system to create new LUNs according to the specified characteristics of the hypothetical LUNs.

Figure 2:
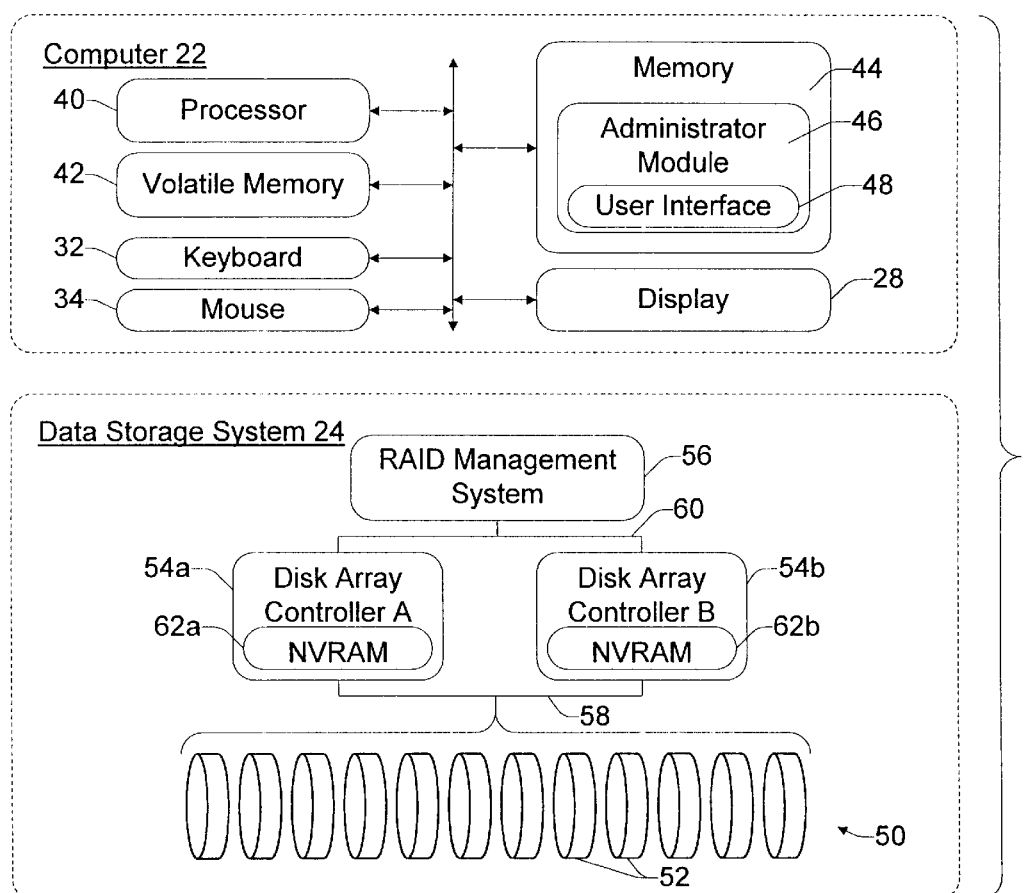
FIG. 2 is a block diagram of the host computer and data storage system. The data storage system is illustrated as a hierarchic RAID system.

FIG. 2 shows the host computer 22 and data storage system 24 in more detail. The computer 22 has a processor 40, a volatile memory 42 (i.e., RAM), a keyboard 32, a mouse 34, a non-volatile memory 44 (e.g., ROM, hard disk, floppy disk, CD-ROM, etc.), and a display 28. An administrator module 46 is stored in memory 44 and executes on processor 40. Among other management functions (e.g., diagnostics, performance review, etc.), the administrator module 46 enables the administrator to experiment with different hypothetical LUN arrangements, and then provides feedback as to how the hypothetical LUN arrangements, if implemented, would affect available capacity. The administrator module 48 supports a storage manager graphical user interface (UI) 48 that presents a visual interface on the display 28. The graphical UI 48 allows the administrator to propose new LUNs through simple point-and-click controls and to see the affect on available capacity that would result from adding the new LUNs.

The data storage system 24 has a disk array 50 with multiple storage disks 52, a disk array controller 54, and a RAID management system 56. The disk array controller 54 is coupled to the disk array 50 via one or more interface buses 58, such as a small computer system interface (SCSI). The RAID management system 56 is coupled to the disk array controller 54 via an interface protocol 60. It is noted that the RAID management system 56 can be embodied as a separate component (as shown), or within the disk array controller 54, or within the host computer 22. The RAID management system 56 is preferably a software module that runs on the processing unit of the data storage system 24, or on the processor 40 of the computer 22.

The disk array controller 54 coordinates data transfer to and from the disk array 50. The disk array controller 54 is implemented as dual controllers having a first disk array controller 54a and a second disk array controller 54b. The dual controllers enhance reliability by providing continuous backup and redundancy in the event that one controller becomes inoperable. The dual controllers 54a and 54b have non-volatile RAM (NVRAM) 62a and 62b to provide cache memory, which is further presented to the user as part of the storage space.

The disk array 50 can be characterized as different storage spaces, including its physical storage space and one or more virtual storage spaces. Maps relate the various views of storage. For example, the physical storage space of the disk array can be mapped into a RAID-level virtual storage space, which delineates storage areas according to various data reliability levels. Some areas in the RAID-level virtual storage space are allocated for a first reliability storage level, such as mirror or RAID 1, and other areas can be allocated for a second reliability storage level, such as parity or RAID 2–5. The RAID-level virtual storage space is mapped into an application-level virtual storage space, which presents to the user a contiguously addressable storage space. The physical and RAID-level views are hidden from the user beneath the application view.

The RAID management system 56 manages how user data is stored according to different redundancy schemes. The RAID management system 56 is capable of configuring the application-level storage space into various LUN types that differ depending upon the type of physical storage (i.e., disk array or cache) and the redundancy levels (i.e., RAID 0-5). For purposes of continuing discussion, suppose the administrator can specify three different types of LUNs. One LUN type is comprised solely of cache memory found on the NVRAM 62. A second LUN type is comprised solely of RAID 1 storage space in the disk array 50. In this LUN, data is stored at the RAID-level view according to mirror redundancy.

The third LUN type is comprised of a combination of RAID levels, such as a mixture of RAID 1 and RAID 5. In the third LUN type, the RAID management system automatically migrates data between two different RAID levels (e.g., RAID 1 and RAID 5) as storage demands and free space change. In this manner, data once stored according to mirror redundancy (RAID 1) may be shifted and stored using parity redundancy (RAID 5), or vice versa. This third LUN type is referred to as "AutoRAID" because the RAID management system automatically adjusts the data among multiple reliability levels.

U.S. Pat. No. 5,392,244, which is mentioned in the Background section, describes a hierarchical RAID system that migrates data from one RAID type to another RAID type as data storage conditions and space demands change. The reader is directed to this incorporated patent for a more detailed discussion of how the RAID management system 56 performs data migration.

The administrator can specify one or more LUNs to store the user data. For instance, the administrator might establish one or more cache-type LUN(s), one or more RAID1-type LUN(s), and one or more AutoRAID-type LUN(s) on the same data storage system 24. Once the data storage system is operating under a current arrangement, the administrator might further propose creating additional LUNs of various types. For a fixed amount of physical space, the different LUN types consume physical space at different rates. Accordingly, when the administrator wishes to change the configuration, an aspect of this invention is to assist the administrator in determining how a new LUN of a given type would impact the current configuration.

Figure 3:
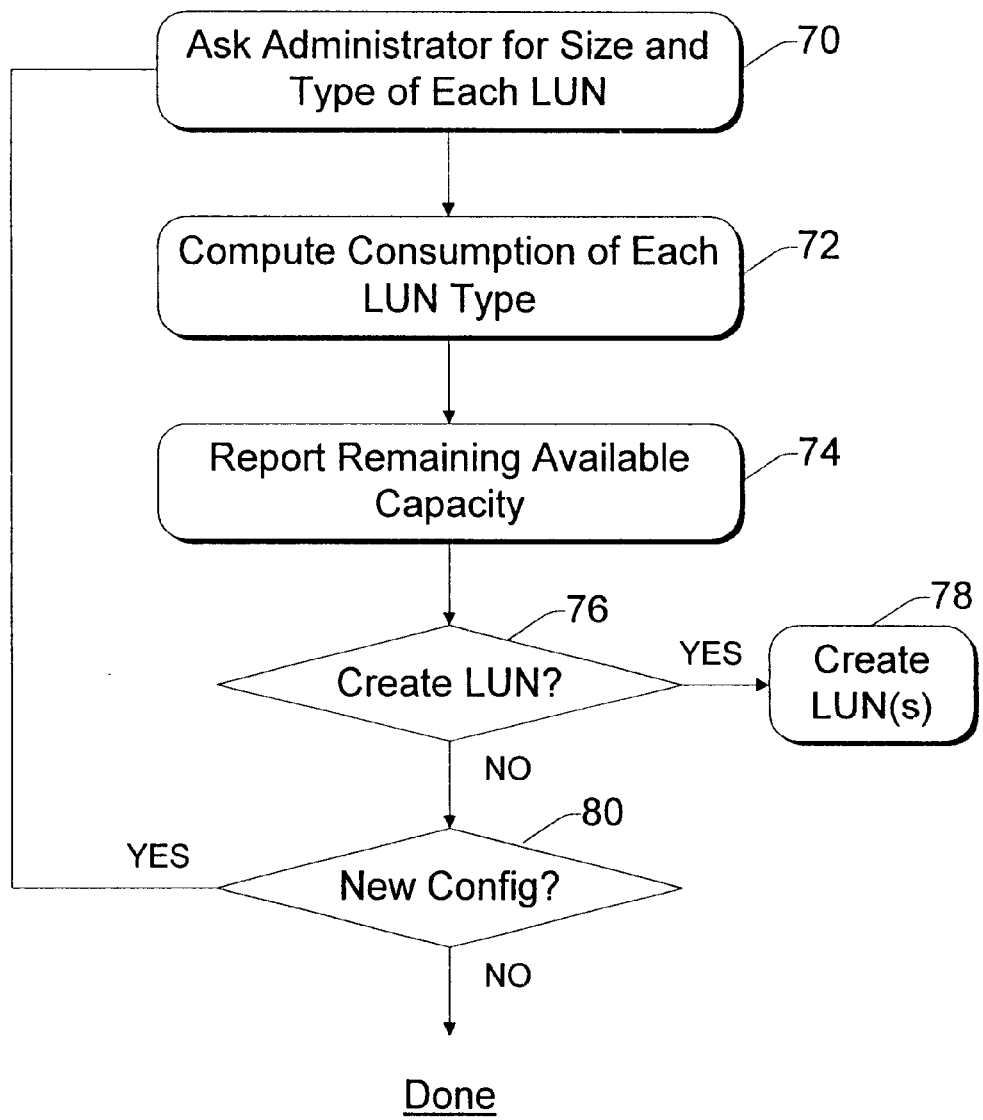
FIG. 3 is a flow diagram showing steps in a method for reporting available capacity.

FIG. 3 shows the steps performed by the computer system 20 while the administrator considers different LUN arrangements. At step 70, the administrator module 46 asks the administrator to enter possible LUN arrangements into the host computer 22 via the graphical user interface 48. For each new LUN, the administrator specifies the type and size of the LUN. The input parameters are passed to the RAID management system 56, which combines the proposed hypothetical LUNs with the existing LUN arrangement and computes the memory space consumption of each LUN type (step 72). That is, the RAID management system 56 determines how much space is consumed by the cache-type LUNs, the RAID1-type LUNs, and the AutoRAID-type LUNs.

Using this computation, the RAID management system 56 reports the capacity that remains available to the user assuming the proposed LUNs are created and added to the system (step 74). The available capacity is preferably reported visually via the graphical user interface 48, although other techniques are possible, such as a print out.

One possible technique for computing available capacity is described in U.S. patent application Ser. No. 08/382,350, entitled "Method for Avoiding Over-Commitment of Virtual Capacity in a Redundant Hierarchic Data Storage System," which was filed Feb. 1, 1997 in the names of Theresa A. Burkes, Bryan M. Diamond, and Marvin D. Nelson. This patent application, which is assigned to Hewlett-Packard Company, is incorporated by reference. It is noted, however, that other techniques for computing available capacity may be used.

In the event that there is insufficient space for any hypothetical LUN, the RAID management system 56 reports to the administrator that there is not sufficient physical space available to support the hypothetical LUN.

It is noted that steps 72 and 74 may also be performed outside of the RAID management system 56, such as within the administrator module 46 running on the host computer 22. It is further noted that the administrator module 46 can be implemented as a distributed application running at both the host computer 22 and the client.

At step 76 in FIG. 3, the graphical user interface 48 asks the administrator if he/she would like to create the real LUNs having the same characteristics as the hypothetical LUNs. If so (i.e., the "yes" branch from step 76), the RAID management system 56 creates one or more LUN(s) according to the size and type specified by the administrator (step 78). Conversely (i.e., the "no" branch from step 76), the administrator simply tries a different LUN configuration or exits from the tool (step 80).

The proposed LUN arrangements can be passed from the administrator module 46 to the RAID management system 56 in various data structures. As one example, the administrator module 46 simply sends a message with a single LUN type. The RAID management system replies with a message indicating the amount of available capacity for that LUN type. As another possibility, the administrator module creates a first table to correlate hypothetical individual LUN types, sizes, and identification numbers (optional) and passes the table to the RAID management system 56. In turn, the RAID management system returns a second table that relates each LUN type with the available capacity for that LUN type after having accounted for both the hypothetical LUNs described in the first table and the existing LUNs.

FIGS. 4–7 show exemplary UI screens that are supported by storage manager UI 48 and depicted on the monitor 28. The screens are described in the context of graphical user interface windows, such as those supported by operating systems that present applications in a graphical user interface windowing environment. Examples of suitable operating systems include Windows® brand operating systems from Microsoft Corporation and operating systems from Apple Computer.

Figure 4:
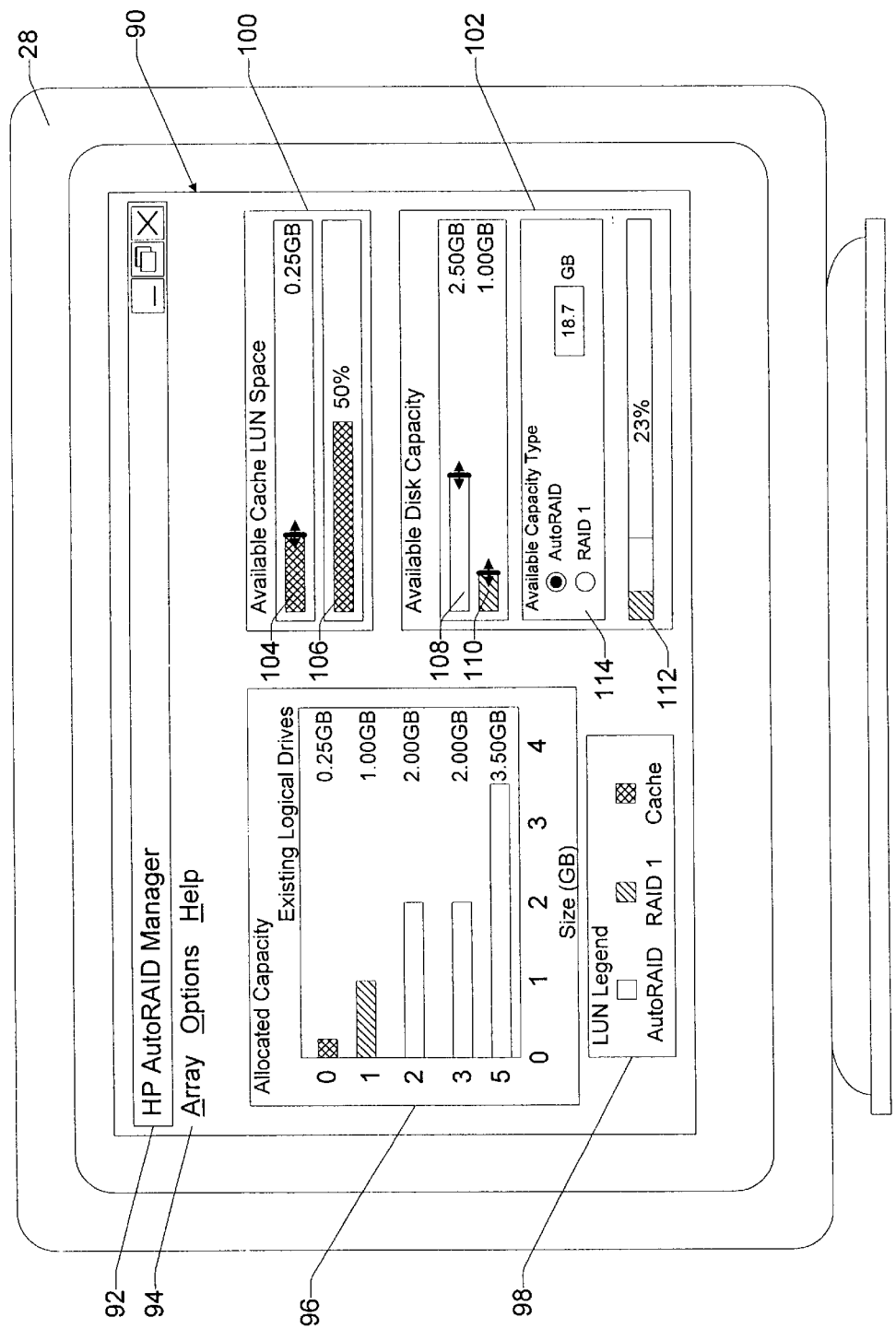
FIGS. 4–7 show different graphical user interface screens depicted on a monitor, which are used to report available capacity.

FIG. 4 shows a UI screen in the form of a graphical user interface window 90 having a conventional title bar 92 and menu 94. The storage manager UI 90 shows an allocated capacity chart 96 that reveals the present allocated capacity for the existing LUNs. The chart 96 has multiple bars that extend horizontally to exhibit the current size of the LUNs. A LUN legend 98 is situated below the chart 96 to identify the LUN types.

In this example, allocated capacity chart 96 indicates that the data storage system currently has LUNs 0, 1, 2, 3, and 5. LUN 0 is a cache-type LUN that is 0.25 GB (gigabytes) in size. LUN 1 is a RAID1-type LUN that is 1 GB in size. LUNs 2, 3, and 5 are AutoRAID-type LUNs that are 2, 2, and 3.5 GB in size, respectively.

LUN manipulation controls are provided on the right hand side of the window 90 to enable the administrator to manipulate the current LUN arrangement to add or remove LUNs. In the FIG. 4 implementation, two separate controls are provided: a cache control 100 to adjust cache-type LUN consumption and a disk control 102 to adjust disk-type LUN consumption.

In the illustrated implementation, the cache control 100 offers a sliding bar 104 that can be moved via a mouse pointer to increase or decrease a new amount of cache-type LUN space that the administrator might wish to add to the data storage system. A percentage indicator 106 shows the percentage of total cache-type LUN space available. As the administrator moves the sliding bar 104 to increase (or decrease) the amount of new cache-type LUN space, the percentage indicator 106 dynamically readjusts to report to the administrator the impact such changes have on available cache capacity. The movement of the sliding bar 104 is constrained within the user interface to prevent sliding past a point of 100% consumption for a particular LUN type. Here, the administrator has set the amount of cache-type LUN space to an additional 0.25 GB, which if combined with the existing 0.25 GB, would consume fifty percent (50%) of the available cache space.

The disk control 102 has two sliding bars: an AutoRAID sliding bar 108 and a RAID1 sliding bar 110. A percentage indicator 112 shows the percentage of total disk space available given the settings of the two sliding bars 108 and 110. The total percentage shown in indicator 112 is calculated assuming a LUN arrangement that includes the existing RAID 1 and AutoRAID LUNs in the allocated capacity chart 96 (i.e., LUNs 1, 2, 3, and 5) and the proposed RAID 1 and AutoRAID LUNs specified in disk control 102. The total percentage indicator 112 contains a composite bar with different shadings (or color) that represents the space consumed by the AutoRAID-type LUNs and the RAID1-type LUNs.

The disk control 102 also provides a type selection box 114 that allows the administrator to select the AutoRAID or RAID 1 type LUNs to determine how much available capacity for that type of LUN exists assuming the proposed LUN arrangement. In this example, the AutoRAID-type LUN is checked, and 18.7 GB of memory is available for this type of LUN.

With the storage manager UI 90, the administrator can adjust the sliding bars 104, 108, and 110 to propose different LUN arrangements consisting of one or more of the three LUN types at variable capacities. The administrator can observe how the addition of new LUNs will affect available capacity by manipulating these controls. Once the administrator arrives at a desired arrangement, the administrator can physically create the LUNs according to the proposed parameters such as size and type.

Suppose, for example, the administrator would like to create a new cache-type LUN having a size of 0.25 GB. The administrator places the mouse pointer on the cache control 100, or more particularly the sliding bar 104, and clicks the mouse button to open a dialog window.

Figure 5:
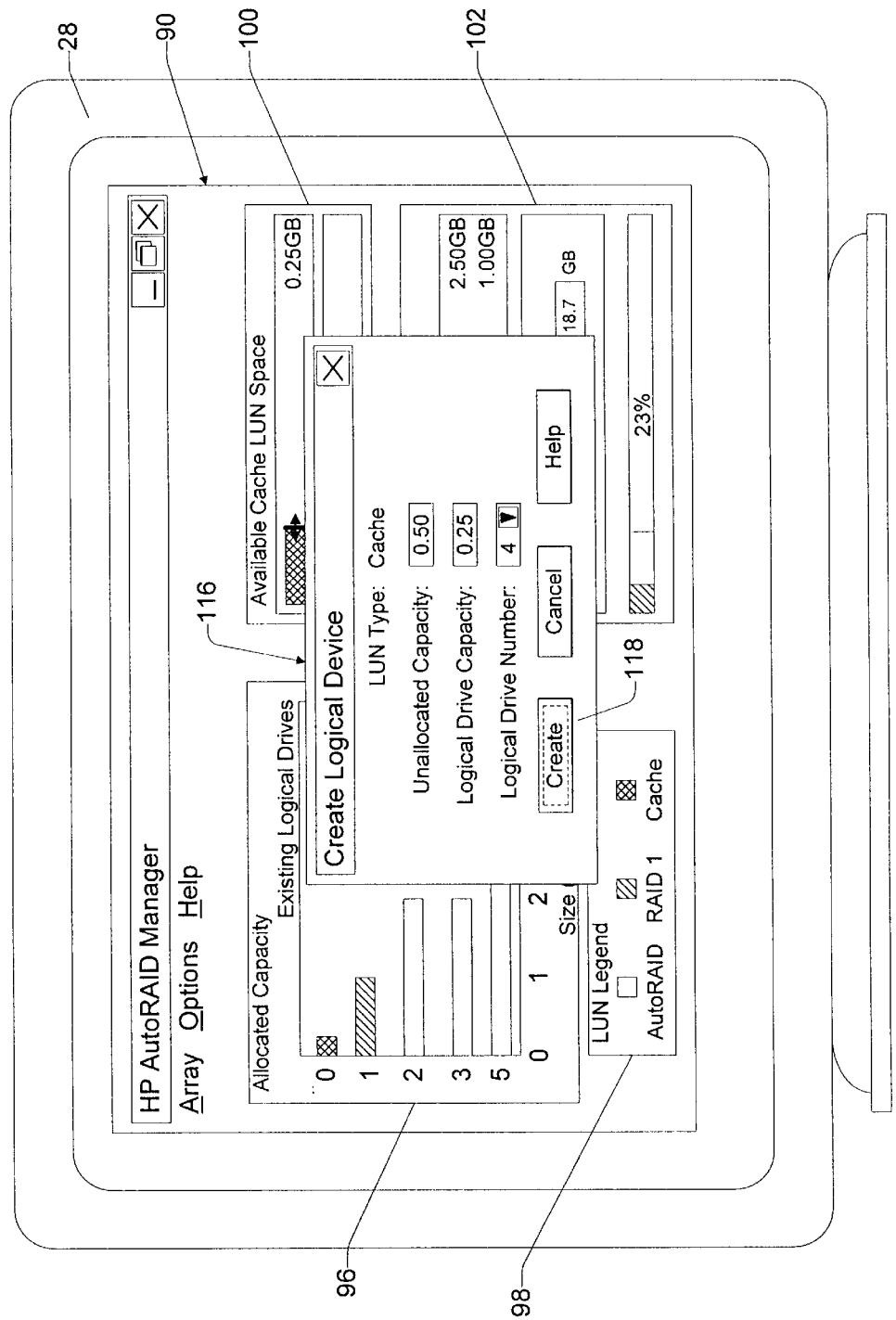

FIG. 5 shows a dialog window 116 overlaid on the storage manager UI 90. The dialog window 116 is used to create a new cache-type LUN. The dialog window 116 indicates the LUN type and informs the administrator of the unallocated capacity of 0.5 GB (which assumes a configuration of the existing 0.25 GB LUN 0 and the proposed new 0.25 LUN). The dialog window 116 provides an entry for the administrator to change the capacity of the new LUN, with the capacity initially defaulting to the size specified by the sliding bar 104 in FIG. 4. The administrator can further set an identification number for the new LUN, with a default being the next unused number (e.g., 4). Once the parameters are set, the administrator can click on the "create" button 118, and the RAID management system 56 will create a new LUN 4, which is a cache-type LUN having a capacity of 0.25 GB.

Figure 6:
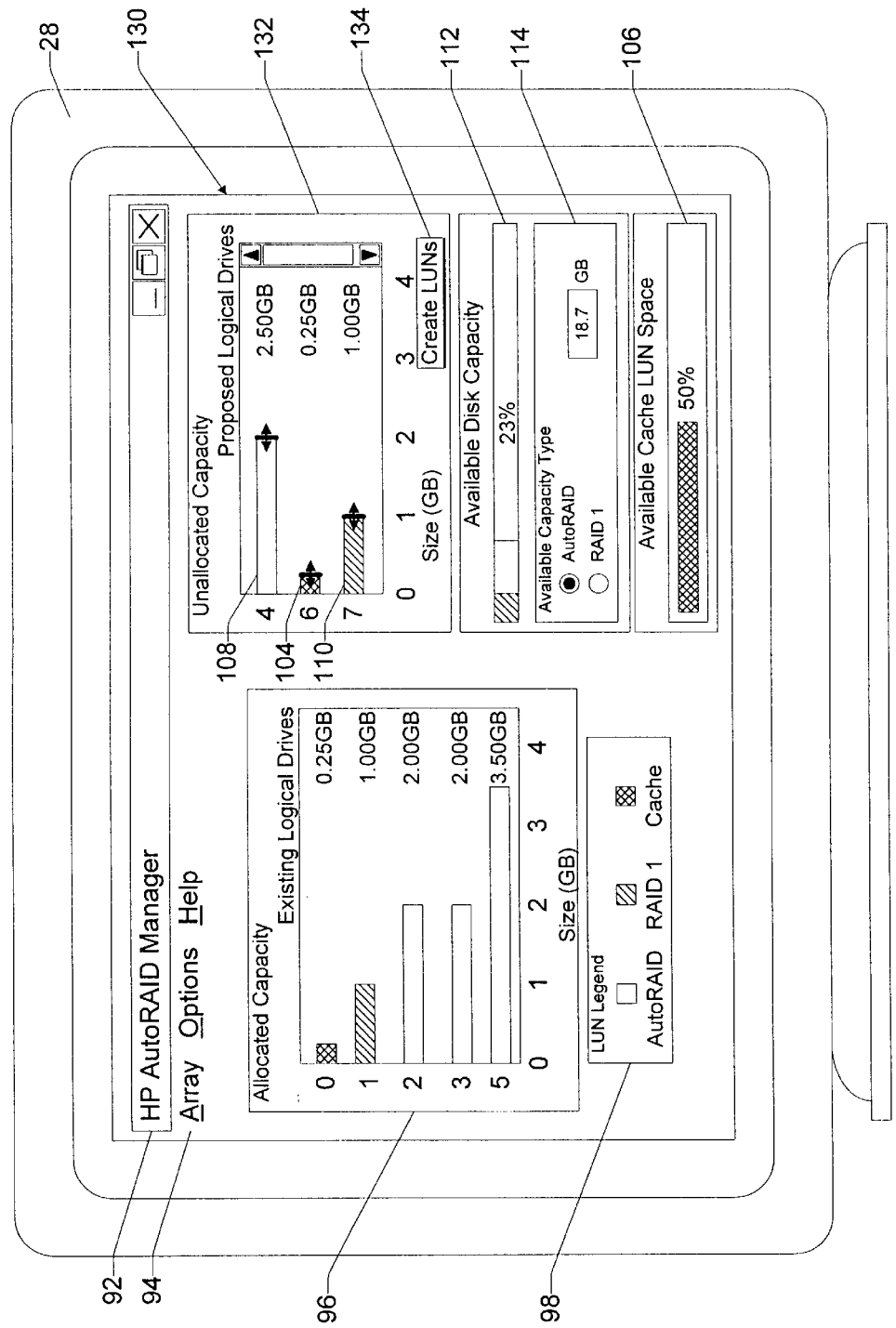

FIG. 6 shows an alternative graphical user interface window 130 for the storage manager. Like the storage manager UI 90 in FIG. 4, the storage manager UI 130 has a title bar 92, menu 94, an allocated capacity chart 96, and a LUN legend 98. The storage manager UI 130 differs, however, in the presentation of proposed new LUNs. The UI 130 places the sliding bars 104, 108, and 110 of the cache and disk controls within the same unallocated capacity box 132.

In this example, the unallocated capacity box 132 contains three new hypothetical LUNs 4, 6, and 7. LUN 4 is an AutoRAID-type LUN of 2.50 GB, LUN 6 is a cache-type LUN of 0.25 GB, and LUN 7 is a RAID1-type LUN of 1.00 GB. The administrator can manipulate the size of the LUNs by sliding the bars 104, 108, and 110 back and forth. As the bars are moved, the disk percentage indicator 112 and cache percentage indicator 106 are dynamically adjusted to demonstrate how the new LUN capacities affect available capacity. A "Create LUNs" button 134 is provided in the box 132 to enable the administrator to create one or more new LUNs based on the specified characteristics.

Figure 7:
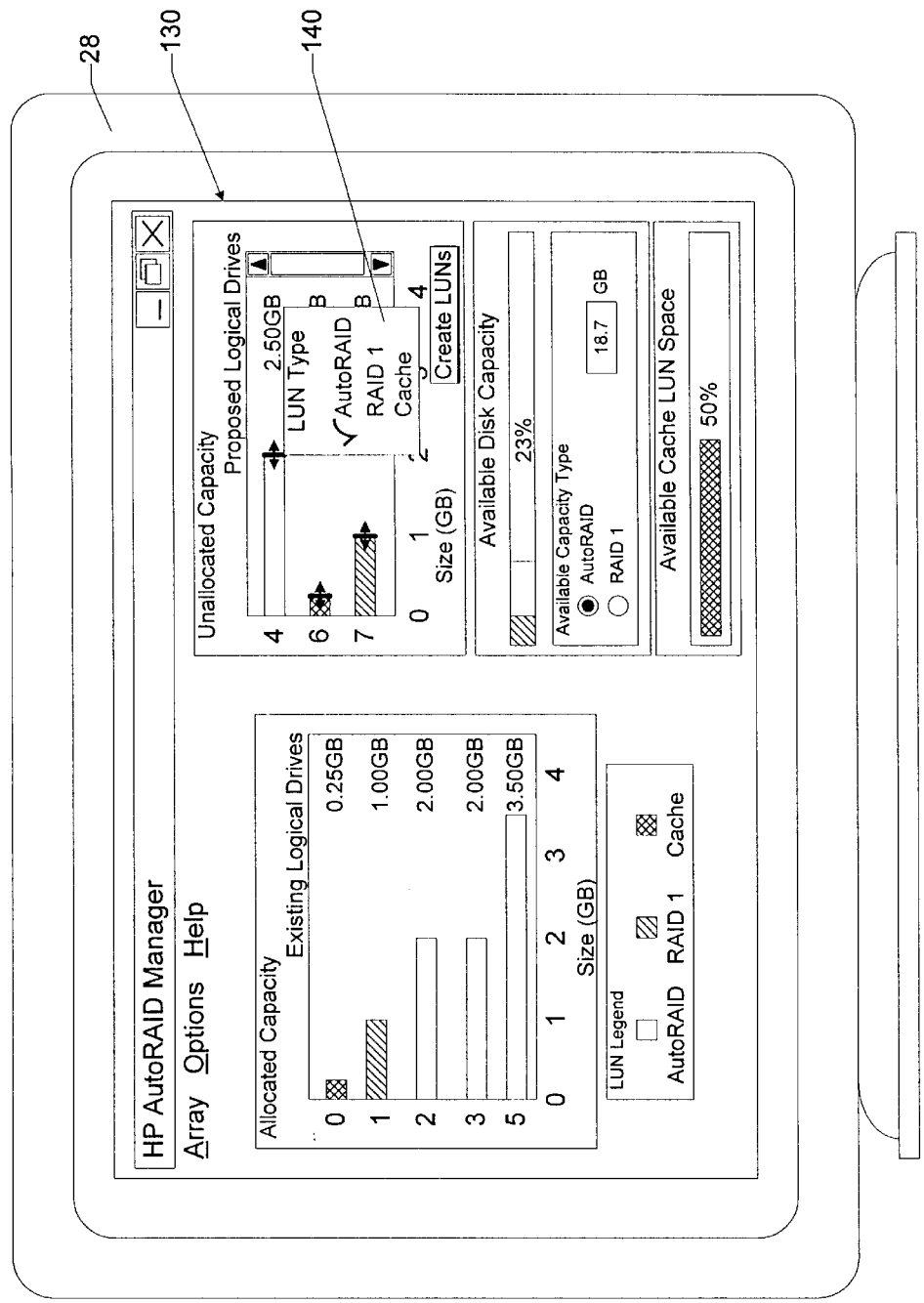

The administrator can change the type of LUN by clicking on a particular sliding bar that represents a particular LUN type. This action pops up a menu that enables the administrator to change LUN type. For instance, suppose the administrator clicks on the hypothetical LUN 4. FIG. 7 shows a menu 140 that pops up. The menu 140 shows that the LUN 4 is presently an AutoRAID-type, as indicated by the check mark. The administrator can change select a different LUN type by checking one of the other alternatives.

FIGS. 4–7 shows exemplary user interfaces that enable an administrator to propose different LUN arrangements and to report how such arrangements affect available capacity. Other graphical UI layouts may alternatively be used to present essentially the same information.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A storage management system for a data storage system, comprising:
    a data storage manager to store data in an existing logical unit arrangement comprising multiple different types of logical units and to compute, for a given arrangement of logical units, an available capacity that represents storage capacity on the data storage system that can be utilized to store additional data; and
    an administrative tool interfaced with the data storage manager to enable an administrator to propose a hypothetical logical unit arrangement that is different from the existing logical unit arrangement, the administrative tool reporting to the administrator how the hypothetical logical unit arrangement, if implemented, would affect available capacity.

2. A storage management system as recited in claim 1, wherein the arrangement of logical units comprises one or more identified logical units.

3. A storage management system as recited in claim 2, wherein the identified logical units are typed according to different redundancy techniques so that a logical unit of one type stores data according to a first redundancy technique and a logical unit of a second type stores data according to a second redundancy technique.

4. A storage management system as recited in claim 2, wherein the identified logical units are one of three types: a cache-type logical unit that stores data in a cache memory, a RAID 1-type logical unit that stores data according to RAID 1, and an AutoRAID-type logical unit that stores data according two RAID levels and allows the data to migrate between the two RAID levels.

5. A storage management system as recited in claim 1, wherein arrangement of logical units comprises one or more types of logical units such that the available capacity is computed for each individual type of logical unit.

6. A storage management system as recited in claim 1, wherein the administrative tool supports a graphical user interface with controls representative of the different logical unit types, the user interface enabling the administrator to graphically manipulate the controls to vary logical unit arrangements.

7. A storage management system as recited in claim 6, wherein the graphical user interface dynamically reports, in response to the administrator's manipulation of the controls, how the hypothetical logical unit arrangements affect available capacity.

8. A storage management system as recited in claim 1, wherein the administrative tool enables the administrator to physically implement the hypothetical logical unit arrangement as a new logical unit arrangement.

9. A data storage system, comprising:
    a disk array having a number of disks that defines a physical storage space;
    a RAID management system to map a RAID-level storage space onto the physical storage space of the storage disks, the RAID-level virtual storage space presenting the physical storage space as multiple RAID areas including mirror RAID areas that store data according to mirror redundancy and parity RAID areas that store data according to parity redundancy, the RAID management system being operable to migrate data between the parity and mirror RAID areas;
    a cache memory;
    an administrator module interfaced with the RAID management system to enable an administrator to create one of three types of logical units (LUNs): a cache-type LUN that stores data in the cache memory, a RAID1-type LUN that stores data in the mirror RAID areas, and an AutoRAID-type LUN that stores and migrates data among the mirror and parity RAID areas; and
    the administrator module being configured to enable the administrator to propose various hypothetical LUN arrangements with different types of LUNs and to report to the administrator how the hypothetical logical unit arrangements, if implemented, would affect available capacity in the disk array and cache memory.

10. A data storage system as recited in claim 9, wherein the administrator module supports a graphical user interface with controls representative of the different LUN types, the user interface enabling the administrator to graphically manipulate the controls to vary the hypothetical LUN arrangements.

11. A data storage system as recited in claim 9, wherein the administrator module supports a graphical user interface with controls representative of the different LUN types, the user interface enabling the administrator to graphically manipulate the controls to vary the hypothetical LUN arrangements.

12. A data storage system as recited in claim 9, wherein the administrator module enables the administrator to physically implement the hypothetical LUN arrangement as a new LUN arrangement.

13. A program embodied on a computer-readable medium for managing a data storage system, comprising:
    a code segment to enable an administrator to specify characteristics of hypothetical logical units that may be added to the data storage system so that the administrator can try different hypothetical logical unit arrangements composed of multiple different types of logical units;
    a code segment to compute an available capacity of the data storage system that accounts for both existing logical units in the data storage system and the hypothetical logical units specified by the administrator; and
    a code segment to report the available capacity to the administrator so that the administrator can examine how the hypothetical logical unit arrangement, if implemented, would affect the available capacity.

14. A program as recited in claim 13, further comprising a code segment that presents a graphical user interface with controls representative of the different logical unit types, the user interface enabling the administrator to graphically manipulate the controls to vary the characteristics of the hypothetical logical units.

15. A program as recited in claim 13, further comprising a code segment that creates one or more logical units with the characteristics specified by the administrator for the hypothetical logical units.

16. For use with a data storage system, a storage manager user interface (UI) embodied on a computer-readable medium to present an existing logical unit arrangement having one or more types of logical units on the data storage system, the storage manager UI further presenting controls representative of different types of hypothetical logical units that may be added to the data storage system, the storage manager UI enabling the administrator to graphically manipulate the controls to vary characteristics of the hypothetical logical units and to dynamically report, in response to the administrator's manipulation of the controls, how the hypothetical logical units, if created, would affect available capacity.

17. A method for managing a data storage system, comprising the following steps:

enabling an administrator to specify characteristics of hypothetical logical units that may be added to existing logical units on the data storage system;

computing an available capacity of the data storage system that accounts for both the existing logical units and the hypothetical logical units specified by the administrator; and reporting the available capacity to the administrator so that the administrator can examine how the hypothetical logical unit arrangement, if implemented, would affect the available capacity.

18. A method as recited in claim 17, further comprising the following steps:

presenting a graphical user interface with controls representative of the different logical unit types; and enabling the administrator to graphically manipulate the controls to vary the characteristics of the hypothetical logical units.

19. A method as recited in claim 17, further comprising the step of creating one or more logical units with the characteristics specified by the administrator for the hypothetical logical units.

20. A computer-readable medium having computer-executable instructions for performing the steps in the method as recite din claim 17.

\* \* \* \* \*